United States Patent [19]

Yamaguchi et al.

[11] Patent Number: 4,631,710
[45] Date of Patent: Dec. 23, 1986

[54] AZIMUTH ADAPTIVE PHASED ARRAY SONAR

[75] Inventors: Keiki Yamaguchi; Takao Higashiizumi; Toru Shimazaki; Shinichi Sano; Yasuhito Takeuchi, all of Tokyo, Japan

[73] Assignee: Yokogawa Medical Systems, Limited, Tokyo, Japan

[21] Appl. No.: 591,036

[22] Filed: Mar. 19, 1984

[30] Foreign Application Priority Data

Apr. 18, 1983 [JP] Japan .................................. 58-68231

[51] Int. Cl.$^4$ ......................... G01S 3/80; G10K 11/34
[52] U.S. Cl. ..................... 367/103; 367/905
[58] Field of Search .............. 367/103, 121, 123, 905, 367/48, 49, 61, 62; 343/378, 379; 73/625

[56] References Cited

U.S. PATENT DOCUMENTS

| | | | |
|---|---|---|---|
| 3,419,845 | 12/1968 | Thiede et al. | 367/103 |
| 4,199,246 | 4/1980 | Muggli | 367/101 |
| 4,478,085 | 10/1984 | Sasaki | 73/625 |

Primary Examiner—Richard A. Farley
Assistant Examiner—Daniel T. Pihulic
Attorney, Agent, or Firm—Moonray Kojima

[57] ABSTRACT

In ultrasonic transmission from and reception by an array probe in a phased array sonar, when an ultrasonic beam is directed substantially in front of the array probe, an ultrasonic wave having a high center frequency $f_o$, or a bandwidth extending into higher frequencies, is transmitted and/or received in order to insure a high image resolution. When the ultrasonic beam is steered sideways, an ultrasonic wave having a lower center frequency $f_o$, or a higher frequency range cutoff in relation to a steering angle $\theta$, is transmitted and/or received in order to increase the angle at which grating lobes are generated and hence prevent such grating lobes from entering the angle range of the field of view.

8 Claims, 9 Drawing Figures

AZIMUTH ADAPTIVE PHASED ARRAY SONAR

BACKGROUND OF THE INVENTION

1. Field of Invention

This invention relates to an azimuth adaptive phased array sonar for use in a medical or underwater ultrasonic imaging system, and more particularly to an azimuth adaptive phased array sonar capable of suppressing grating lobe ghosts or artifacts.

2. Description of Prior Art

Known in the art are phased array sonars having an array probe comprising an array of a plurality of transducer elements (hereinafter called "elements") energized with an appropriate phase arrangement for transmitting ultrasonic waves into, or receiving ultrasonic waves from, an objective space while controlling the beam direction of the waves.

The prior phased array sonars, however, are plagued with ghosts (or artifacts) produced by side lobes, particularly grating side lobes.

Ghosts produced by side lobes appear in a direction determined primarily by the ratio of element-to-element pitch to wavelength of the transmitted and received ultrasonic waves, and at a level determined by the total number of activated elements. In principle, these ghosts cannot be reduced by improving the resolution or quantization error of a delay map for phased element energization, or by improving the uniformity of gain and ultrasonic wave transmission and reception efficiencies. Apopization of the transducer elements only results in sharply cut skirts $ML_2$ (see FIG. 1) while sacrificing the width of a main lobe $ML_1$. It also fails to be effective for base lines $D_o$ (FIG. 1) or grating side lobes GSL. The base lines $D_o$ are governed by the total number of transducer elements and the uniformity or deviation, in every meaning thereof, from a theoretical or ideal value. Another factor greatly involved in the grating side lobes is waveform (or a frequency spectrum) received for echo examination, as is apparent from the principle of generation of grating side lobes, illustrated in FIG. 2.

Turning to FIG. 2, elements $T_1$ through $T_6$ are arrayed at a pitch d and are simultaneously energized to produce a main lobe in front of the array. At the same time, waves are brought to be inphase in directions of $\pm\theta$ satisfying $d\cdot\sin\theta \approx \lambda$ ($\lambda$ is the wavelength), in addition to the front of the array, to produce a strong sensitivity in such directions (thus, generating grating lobes).

Where the transmitted and recived waves have a better coherence, the grating side lobes become larger and sharper. Where complete impulse waves are transmitted and received, no grating lobes are generated, but added waveforms from all related elements are not sufficiently cancelled out on base lines $D_o$ and remain appreciably to be continuous side lobes.

In case the band width of transmitted and received waveforms is too wide or extends into a high-frequency range in a phased array system, grating lobes tend to arise at an angular position smaller than angle $\theta$ at a central frequency $f_o$ of the ultrasonic waves.

No problem arises when an ultrasonic beam is directed in front of the array, by selecting the azimuth of possible grating lobes, to be slightly outside (for example $\pm 50°$) of the range of angles of a field of view, or an azimuth range to be detected (for example $\pm 45°$). However, when an ultrasonic beam is steered and scanned, grating lobes come up in the field of view, to thereby produce ghosts.

One solution to the above problem, would be to control the gain of an amplifier circuit for receiving and amplifying an echo signal. With this solution, however, the signal-to-noise ratio would not be improved, and no increased advantage or sufficient advantage and optimization would be reached, and best visibility would surely not be attained.

SUMMARY OF THE INVENTION

Accordingly, an object of the invention is to provide an azimuth adaptive phased array sonar which will not produce grating lobes in a given angle range of field of view, even if the ultrasonic beam is steered.

To achieve the above object, the invention directs an ultrasonic beam in front of an array of transducer elements and a center frequency $f_o$ of either a received signal from each element involved in ultrasonic reception (or a transmitted signal from each element involved in ultrasonic transmission) or an echo signal, in which the received signals are combined in phase so as to have a desired beam angle, is increased to widen the bandwidth into a higher frequency range for a higher resolution. When the beam is steered sideways, the center frequency is lowered in relation to a steering angle, or a higher frequency component is cut off to increase the grating lobe generating angle, so that no grating lobe will be introduced into the angle range of field of view.

DETAILED DESCRIPTION OF THE PREFERRED EMBODIMENTS

Figure 1:
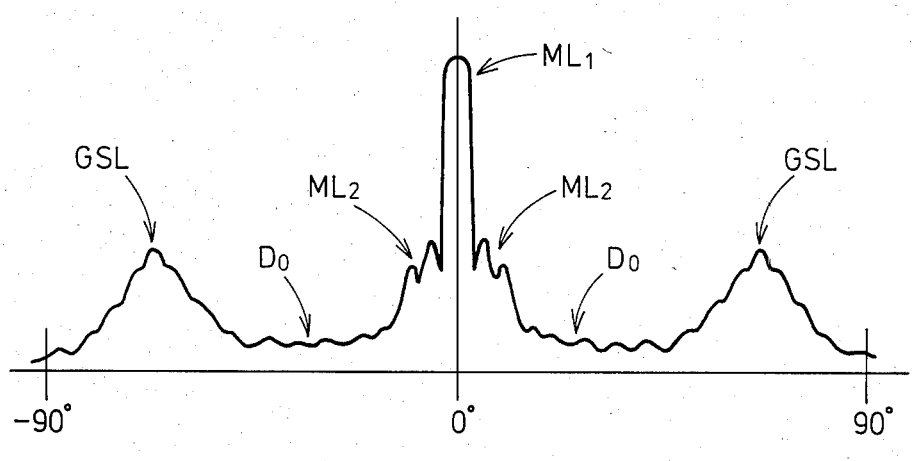
FIG. 1 is a diagram depicting directivity of echo reception of a conventional phased array sonar.
Figure 2:
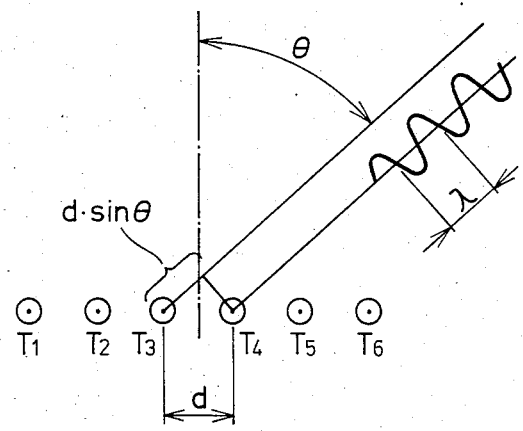
FIG. 2 is a diagram illustrating the principle of generation of grating lobes.
Figure 3:
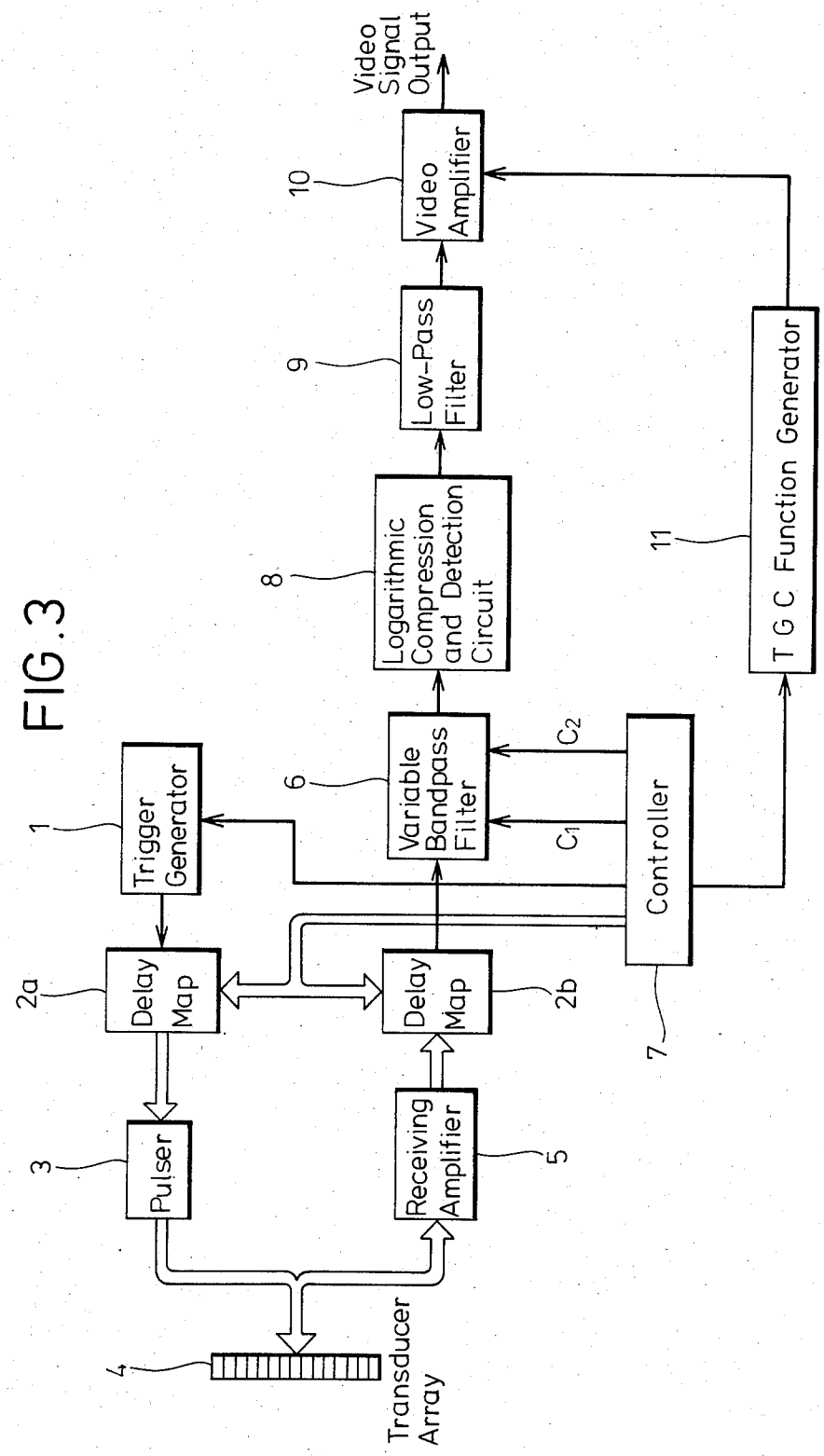
FIG. 3 is a block diagram of an illustrative embodiment of the invention.

FIG. 3 depicts an illustrative phased array sonar according to the invention. The components, construction and operations of the arrangement depicted in FIG. 3 are generally the same as those in the prior art, except for the variable bandpass filter 6 and controller 7 and their operational characteristics.

Variable bandpass filter 6 has its lower cutoff frequency and its higher cutoff frequency, both controlled by controller 7, in the manner to be described. Controller 7 serves to issue (a) a timing signal to a trigger generator 1 and to a TGC (Time Gain Control) function generator 11 and (b) an azimuth control signal to a transmission delay map 2a and to a reception delay map 2b, for establishing suitable delay distribution necessary to determine an azimuth for transmitted and received ultrasonic waves beams, as with conventional sonars. The controller 7 additionally generated signals control signals $C_1$, $C_2$, for changing the lower cut off frequency and higher cut off frequency, respectively, of variable bandpass filter 6, in relation to the azimuth angle of the beam.

In operation, a trigger signal generated by trigger generator 1, and controlled in timing by controller 7, is applied to transmission delay map 2a. Delay map 2a has, in this case, as many delay lines as there are number of transducer elements in array 4. Delays given by the delay lines are controlled by controller 7, to determine delay time distribution, such that a steering angle or azimuth of the transmitted and received beams will be at a predetermined angle, with beam focussing taken into consideration. The delay outputs from delay map 2a are delivered to pulser 3.

Pulser 3 comprises a plurality of pulse drivers, each directly coupled to a respective transducer element 4, and each energizable by an output from a corresponding delay line, for generating transducer drive pulses, to simultaneously excite the respective transducers. This causes an ultrasonic wave to be emitted from the array 4 toward the determined azimuth. Thereafter, echo signals are received by the transducers in array 4, and converted by the transducers into electrical signals. The electrical signals are then amplified by a receiving amplifier 5. The amplified signals are delivered through reception delay map 2b in which the signals are time adjusted for in-phase reception, for a desired beam steering angle, and then combined into a single signal which is fed to variable bandpass filter 6.

Figure 4:
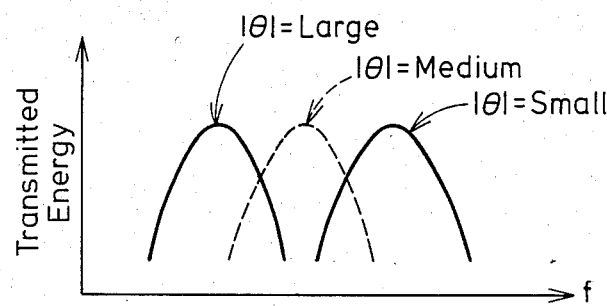
FIGS. 4, 5(A), 5(B), and 5(C) are graphs depicting control of the variable bandpass filter.

Control signals $C_1$ and $C_2$, applied by controller 7, to variable bandpass filter 6, are varied in relation to the beam steering angle. Therefore, variable bandpass filter 6 has its frequency characteristics changed, as shown in FIG. 4, so that the central frequency and the bandwidth will be shifted toward lower frequencies, as the steering angle is increased.

The echo signal, obtained through variable bandpass filter 6, is processed by a logarithmic compression and detection circuit 8 and a low-pass filter 9. The processed signal is then fed into a video amplifier 10, having a bias varied (normally increased) with time by a time dependent bias signal. Video amplifier 10 generates an echo signal in which ultrasonic attenuations, caused, dependent on the depth of an echo source, have been compensated for. Since the signal has a level subjected to a logarithmic compression, addition of bias is equivalent to multiplication of the original signal prior to being subjected to logarithmic compression, thus effecting time gain control (TGC).

Figure 5A:
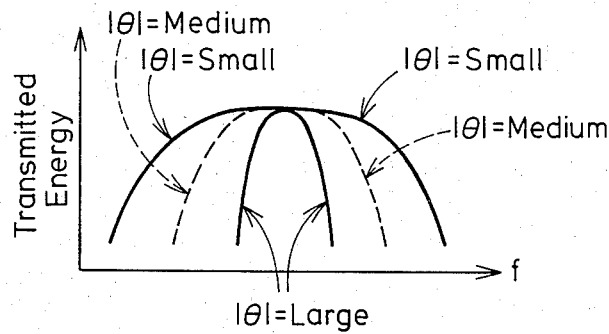
Figure 5B:
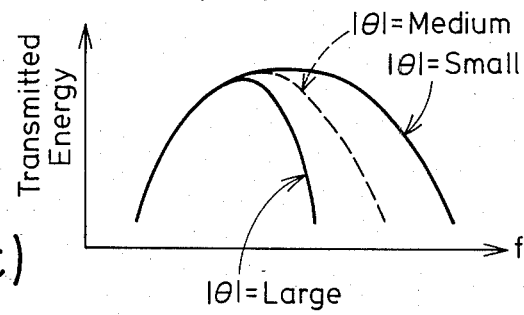
Figure 5C:
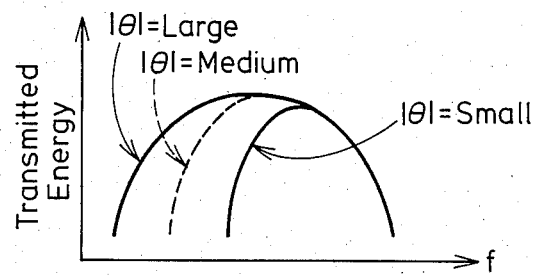

The frequency characteristics of variable bandpass filter 6 and their changes under the control of controller 7 may be selected as shown in FIGS. 5(A),5(B) and 5(C).

More specifically, as shown in FIGS. 5(A),5(B) and 5(C), the low frequency cut-off and high frequency cut-off can be one or both lowered to control the center frequency $f_o$ and the bandwidth B. In FIG. 5(A), the pass bandwidth B is narrowed, by suitable control of the cutoff frequencies. In FIG. 5(B), the lower cutoff frequency is held substantially constant and the higher cutoff frequency is lowered, to change central frequency $f_o$ and bandwidth B. In FIG. 5(C), the lower cutoff frequency is lowered while holding substantially constant the higher cutoff frequency, to suitably control the bandwidth B and center frequency $f_o$.

Figure 6:
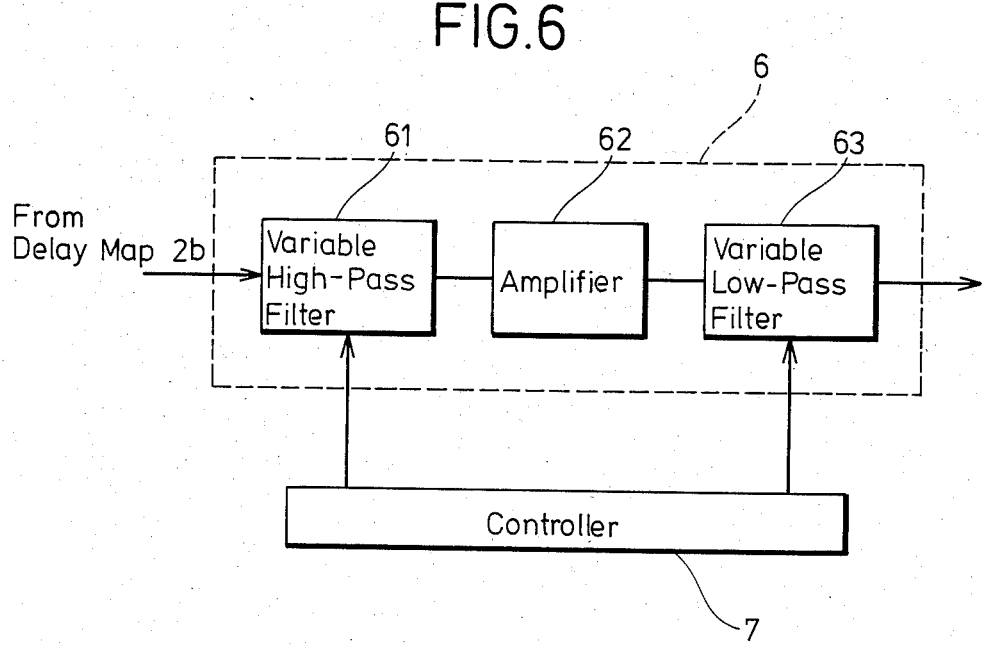
FIG. 6 is a block diagram of the components of the bandpass filter, of FIG. 3.

Variable bandpass filter 6, as shown in FIG. 6, may preferably comprise a variable high pass filter 61, having a cutoff frequency controlled by control voltage signal from controller 7; a wide range amplifier 62 connected to variable high pass filter 61; and a variable low pass filter 63, connected to amplifier 62, and having a cutoff frequency controlled by control voltage from controller 7. Variable low pass filter 63, in particular, should have sharp cutoff frequency characteristics.

Figure 7:
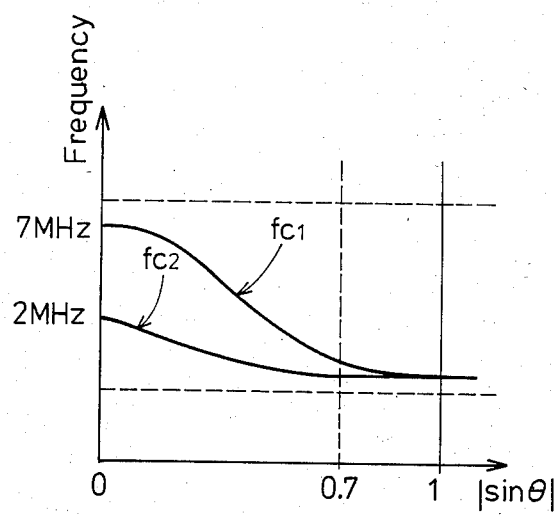
FIG. 7 is a graph illustrating cutoff frequencies of the filters comprising the bandpass filter of FIG. 6.

The cutoff frequency $f_{c1}$ of variable low pass filter 63 and cutoff frequency $f_{c2}$ of variable high pass filter 61, and controlled dependent on $|\sin \theta|$ as illustrated in FIG. 7. As a result, when the ultrasonic beam is directed in front of the transducer array (i.e. when $\theta = 0$), the central frequency $f_o$ remains high or the bandwidth remains in a higher frequency range, so that images of high resolution can be produced. When the beam is steersideways, i.e. away from the direct front of the array, the center frequency $f_o$ is lowered or the higher frequency range is cutoff, as the steering angle $\theta$ is increased, with the result that the angle $\theta$, at which grating lobes are produced, will be increased, thereby to prevent grating lobes from entering the angle range of the field of view. Accordingly, grating lobes artifacts or ghosts, are effectively prevented from being generated in the resultant image being viewed.

Instead of, or in addition to, placing variable bandpass filter 6 directly behind delay map 2b (see FIG. 3) for selecting frequency components from the signal, many variable bandpass filters may be coupled to receiving amplifiers provided respectively for each transducer. Where variable bandpass filter 6 is used for ultrasonic transmission, such facility may be connected to process each output from pulser 4, or coupled to trigger generator 1, provided elemental pulse drivers are linear amplifiers, for changing the frequency characteristics of the driving waveform of an original signal to be transmitted, so that the central frequency of a transmitted ultrasonic wave will be varied in relation to steering angle $\theta$.

The central frequency $f_o$ of variable bandpass filter 6 may be varied dependent on the stering angle $\theta$ and on the depth of the echo source, such that the central frequency will be lowered as the depth of the echo source is increased.

With the arrangement of the present invention, as described above, there is employed a variable bandpass filter having its central frequency lowered, or a higher frequency range cutoff, as a a beam steering angle $\theta$ is increased while an object space is being scanned in a phased array method. The variable bandpass filter may be connected to process all echo signals, or a composite echo signal, or an original signal to be transmitted, or output signals of the pulser suitably shifted in phase for energizing the transducers, and may be employed in ultrasonic transmission, or ultrasonic reception, or both, for preventing grating lobes from appearing in the angle range of the field of view.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. An azimuth adaptive phased array sonar (see FIG. 3), comprising
    a sensor (4) having an array of a plurality of ultrasonic transducer elements (4) which transmit ultrasonic signals and receive echo signals;
    a first delay stage (2a) which in accordance with a trigger signal supplied from a trigger generator (2) generates a plurality of driving signals having a phase relationship corresponding to the direction of transmission of the ultrasonic beams, respectively;

a pulser (3) for amplifying the driving signals to produce output signals which drive said individual ultrasonic elements (4);

an amplifier (5) for amplifying the echo signals detected by said individual ultrasonic transducer elements (4), respectively;

a second delay stage (2b) for delaying the respective output signals of said amplifier (5) for achieving a phase relationship corresponding to the direction of reception of the echo signal;

control means (7) for controlling the phase relationship in said first delay stage (2a) and said second delay stage (2b) in accordance with the respective direction of transmission of the ultrasonic signals and directions of reception of the echo signals;

a bandpass filter (6) disposed in a signal path of received echo signals and/or in a signal path of producing ultrasonic signals, said bandpass filter (6) having a variable frequency response; and wherein said control means (7) further controls said bandpass filter (6) so as to substantially shift the pass band toward a lower frequency side as the azimuth of the ultrasonic beam is increased.

2. The sonar of claim 1, wherein said bandpass filter (6) is controlled by said control means (7) to lower a central frequency as the azimuth of the ultrasonic beam is increased.

3. The sonar of claim 1, wherein said bandpass filter (6) is controlled by said control means (7) to narrow said pass bandwidth as the azimuth of the ultrasonic beam is increased.

4. The sonar of claim 1, wherein said bandpass filter (6) is controlled by said control means (7) to lower both higher cutoff frequency and lower cutoff frequency as the azimuth of the ultrasonic beam is increased.

5. The sonar of claim 1, wherein said bandpass filter (6) is controlled by said control means (7) to process a signal indicative of the received ultrasonic beam immediately subsequent to generation of a composite received ultrasonic beam.

6. The sonar of claim 1, wherein said bandpass filter (6) is controlled by said control means (7) to process all signals indicative of received ultrasonic beam from said transducer elements (4) involved in reception of the ultrasonic beam.

7. The sonar of claim 1, wherein said bandpass filter (6) is controlled by said control means (7) to process each output from a pulser (3) which generates pulses for energizing said array probe.

8. The sonar of claim 1, wherein said bandpass filter (6) is controlled by said control means (7) to process an original transmission signal to be delayed for energizing said array probe (4).

* * * * *